United States Patent [19]

Sauer et al.

[11] Patent Number: 4,832,434

[45] Date of Patent: May 23, 1989

[54] NETWORK COMPRISING A MULTITUDE OF OPTICAL SIGNAL TRANSMISSION LINES CONNECTIBLE TO ONE ANOTHER VIA OPTICAL MIXERS

[75] Inventors: Anton Sauer, Germering; Frank Schmidtke, Munich; Hans Thinschmidt, Germering, all of Fed. Rep. of Germany

[73] Assignee: Siemens Aktiengesellschaft, Berlin and Munich, Fed. Rep. of Germany

[21] Appl. No.: 370,576

[22] Filed: Apr. 21, 1982

[30] Foreign Application Priority Data

Jun. 12, 1981 [DE] Fed. Rep. of Germany ....... 3123445

[51] Int. Cl.⁴ ............................................. G02B 6/28
[52] U.S. Cl. ............................................. 350/96.16
[58] Field of Search .......................... 350/96.15, 96.16; 455/610, 612

[56] References Cited

U.S. PATENT DOCUMENTS 4,281,253 7/1981 Culver ............................ 350/96.16

OTHER PUBLICATIONS

H. H. Witte, Optische Datenbusse für Mess- und Regelaufgaben, Electronik, 4/1981, pp. 63–70.

Primary Examiner—William L. Sikes
Assistant Examiner—Robert E. Wise
Attorney, Agent, or Firm—Hill, Van Santen, Steadman & Simpson

[57] ABSTRACT

For the purpose of expanding the connection capacities of optical mixers in order to form a large network, series connections of such optical mixers are provided. In such networks, such series connections are formed of optical mixers which produce signal transmission paths which are identical to one another. No different signal transmission paths are present in the network overall.

14 Claims, 6 Drawing Sheets

NETWORK COMPRISING A MULTITUDE OF OPTICAL SIGNAL TRANSMISSION LINES CONNECTIBLE TO ONE ANOTHER VIA OPTICAL MIXERS

BACKGROUND OF THE INVENTION

1. Field of the Invention

The present invention relates to a transmission network comprising a plurality of optical signal transmission lines which can be connected to one another via optical mixers, particularly for the purpose of data exchange in computer systems.

2. Description of the Prior Art

In a network of the type generally set forth above, the optical mixers are usually realized as optical star couplers. According to the present state of the art, such an optical star coupler can only be produced with relatively few inputs and outputs, cf., for example, Elektronik 4/1981, pp. 63–70; Dr. H. H. Witte "Optische Datenbusse für Messund Regelaufgaben". If one employs optical star couplers in local networks, there can be a requirement that, for example, up to 1000 subscribers (computer nodes in case such a network is employed in computer systems) are connected over a distance of approximately 1000 m, which corresponds to 1000 or more input/output pairs. Since optical star couplers, respectively, optical mixers, cannot be manufactured with that many input/output lines given known manufacturing techniques, such large networks cannot be directly constructed with such star couplers.

SUMMARY OF THE INVENTION

The object of the present invention is to provide a network with a multitude of optical signal transmission lines which can be connected to one another via optical mixers, particularly for data exchange in computer systems, which comprises an optical or, respectively, opto-electrical circuit arrangement which admits of the connection to a correspondingly large plurality of subscribers.

The above object is achieved in a network of the type generally set forth above which is characterized in that, for the purpose of expanding the connection capacities of the optical mixers to form a large network, series connections of such optical mixers are provided. Such series connections of optical mixers in such networks result in signal transmission paths which are identical to one another. No signal transmission paths of a different type are present in the overall network.

The present invention offers the advantage that networks of practically any desired size can be created.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
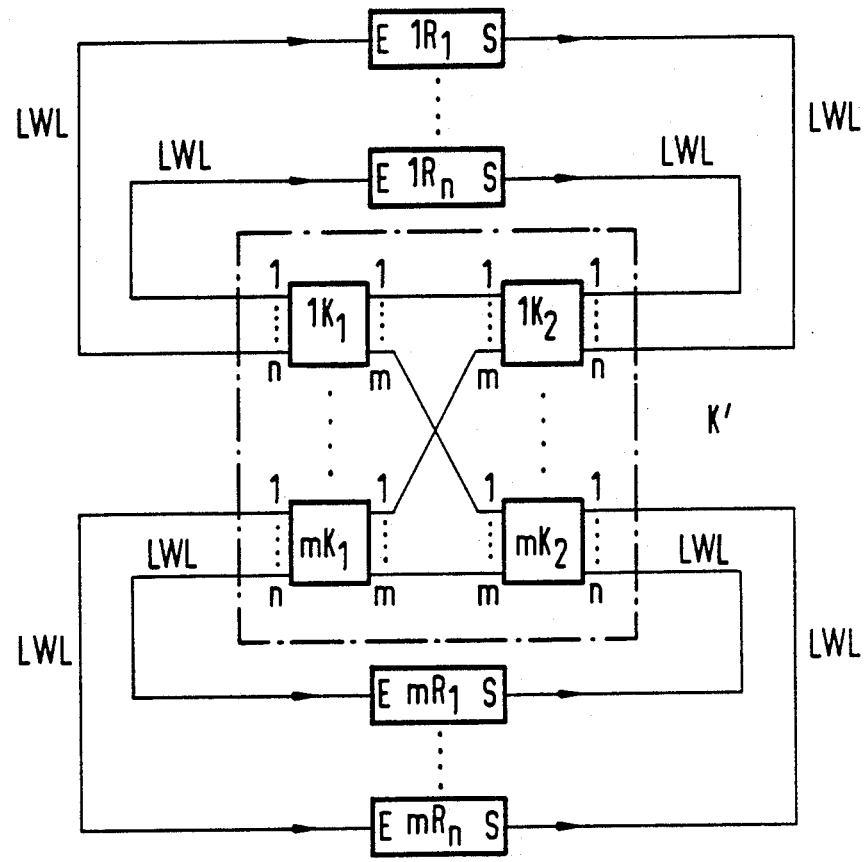
FIG. 1 is a schematic representation of a first exemplary embodiment of a multi-stage, fully meshed switching network constructed in accordance with the present invention.

As briefly set forth above, FIG. 1 illustrates an exemplary embodiment of a two-stage switching network K'. Optical star couplers $1K_1 \ldots mK_1$, $1K_2 \ldots mK_2$ are employed in the arrangement of FIG. 1 as optical mixers. For the purpose of expanding their connection capacities for the formation of a large network in the form of a complete bundle known from switching engineering, the optical mixers, namely the star couplers, are connected in series in the manner illustrated. The start couplers are disposed in such a manner that a disposition of m star couplers $1K_1 \ldots mK_1$ is provided in a light signal output group. Each of n respective light signal outputs of each of the star couplers $1K_1 \ldots mK_1$ is connected via an individual light wave guide LWL to the input of an opto-electrical signal receiver E assigned thereto. A further arrangement of m star couplers $1K_2 \ldots mK_2$ is provided in a light signal input group. Each of n respective light signal inputs of each of the star couplers $1K_2 \ldots mK_2$ of the light signal input group is connected via an individual light wave guide LWL to the output of an electro-optical signal transmitter S assigned thereto. Moreover, each of m respective light signal inputs of the star couplers $1K_1 \ldots mK_1$ of the light signal output group is connected to one of m light signal ourputs of the star couplers $1K_2 \ldots mK_2$ of the light signal input group individually assigned thereto in such a manner that a complete bundle occurs with a respective connection of each electo-optical signal transmitter S to each opto-electrical signal receiver E via two respective star couplers $1K_1 \ldots mK_1$; $1K_2 \ldots mK_2$ connected in series.

Each LWL circuit begins at a subscriber, for example, a computer node, at the transmitter S with a transmission lead, successively traversing two star couplers, for example, the star couplers $1K_2$ and $1K_1$, and ends with a receiving lead at the receiver E of the same subscriber.

All LWL circuits are identically and symmetrically constructed. When a subscriber transmits a message, then the appertaining star coupler of the light signal input group distributes the message to all star couplers of the light signal output group. Proceeding from there, the message arrives at the receivers E of all subscribers. In addition to the possibility of disseminating the messages, the switching network K' also retains all other properties of a simple star coupler, for example, a favorable volume dynamic range and the advantage of a purely passive element. The attenuation of a LWL circuit of a switching network K' increases in comparison to the attenuation of a simple star coupler by a factor which corresponds to the plurality of switching network stages within the switching matrix K' when star couplers with the same ratio of inputs to outputs (n:m) are compared. A star coupler K is non-directional regarding the message transmission, i.e. the side n or the side m can be liberally viewed as an input side or an output side.

When a star coupler has n input and m outputs, then n·m subscribers can be achieved with a two-stage switching network K'. In this case, 2·m star couplers are required for the switching network K'. The lowest expense arises when star couplers K with as many inputs n as possible are employed.

Given the smallest expansion, the switching network K' can comprise two star couplers $1K_1$ and $1K_2$. The inputs or, respectively, outputs, which are not required for the intermediate lines remain unconnected. If the switching network K' is to be expanded for a large number of subscribers, then adds further pairs of star couplers, for example, $2K_1$ and $2K_2$ according to FIG. 1. Advantageously, such an expansion is also possible during operation of the appertaining system.

An advantageous further feature of the invention provides that series connections of optical mixers or, respectively, star couplers, are provided which exhibit at least one further group of optical mixers between the light signal input group and the light signal output group. In this manner, a further enlargement of the overall switching network can be achieved by simple means.

Figure 2:
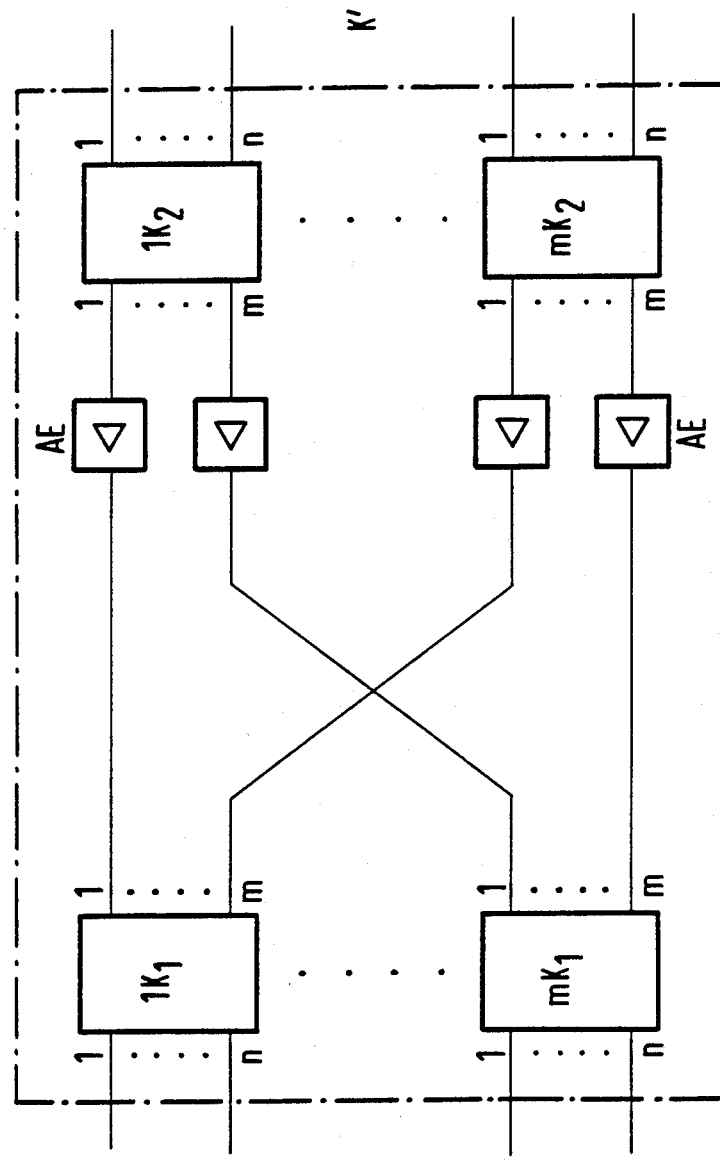
FIG. 2 is a schematic representation of a further exemplary embodiment of a switching network having active elements inserted in the intermediate lines.

Another feature of the invention provides that respective, individually active opto-electronic circuits AE are included, cf. FIG. 2, in the individual connections operating as intermediate lines of a complete bundle, the circuits AE being inserted between the appertaining light signal inputs 1 . . . m of the light signal output group and the appertaining light signal outputs 1 . . . m of the light signal input group. These active opto-electronic circuits AE are signal amplifiers for compensating the attenuation losses which arise due to the series connection of optical mixers or, respectively, star couplers, insofar as these attenuation losses would be disruptive in the overall system. According, to an advantageous further feature of the invention, the active opto-electronic circuits AE respectively contain an opto-electrical signal receiver E' and an electro-optical signal transmitter S', cf. FIGS. 4 and 5. It is advantageously provided that the electro-optical signal transmitters S can be switched on and off. Moreover, the opto-electrical signal receivers E' advantageously respectively have an individual indicator (not illustrated) which perceives a signal flow.

Figure 4:
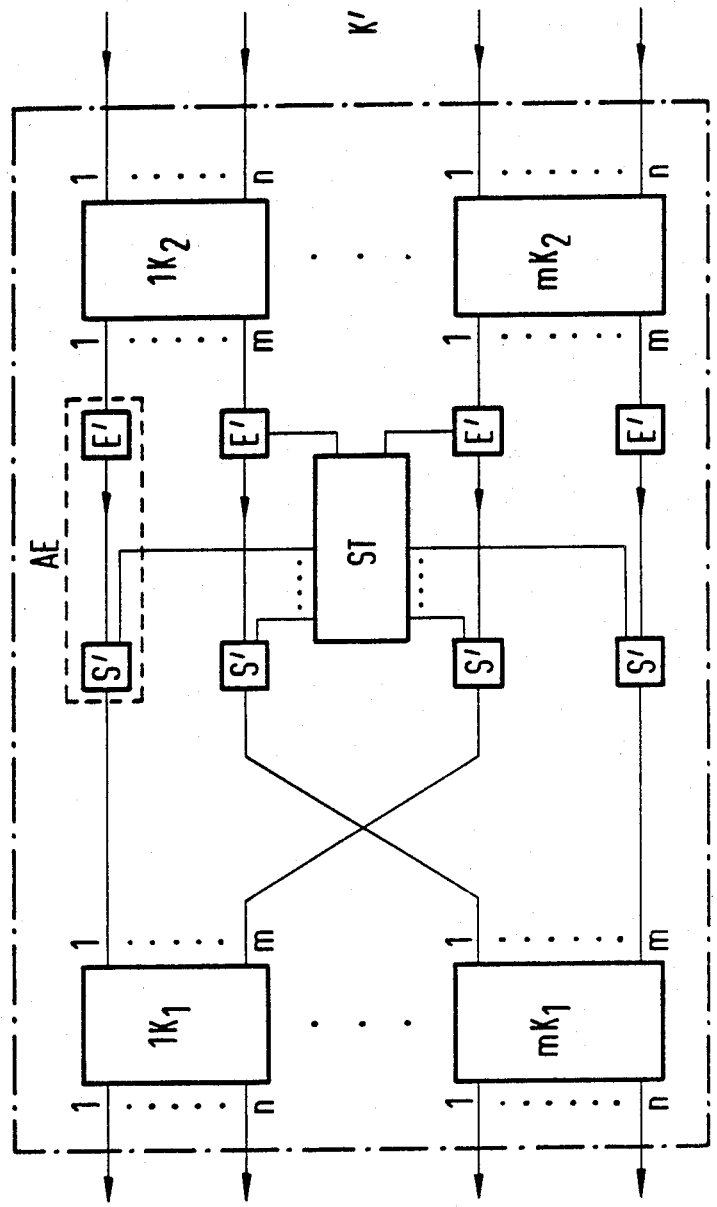
FIG. 4 is a schematic representation of an exemplary embodiment of a switching network having active elements inserted in the intermediate lines and with a control disposed at a central location.

Another advantageous feature of the invention provides that a respective, common indicator I be assigned to the opto-electrical signal receivers E' respectively assigned to a star coupler of the light signal input group, cf. FIG. 4. Such an indicator can directly or indirectly control the electro-optical signal transmitter S', i.e. switch it to be active or passive.

Figure 3:
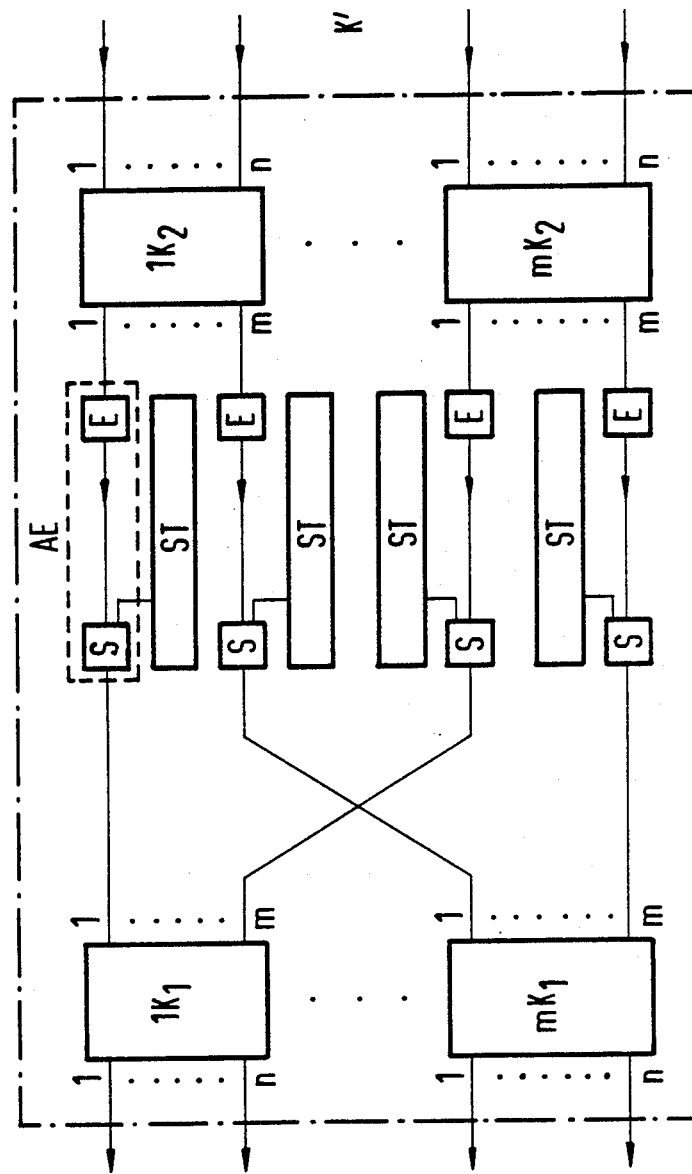
FIG. 3 is a schematic representation of a further exemplary embodiment of a switching network in which an individual control is respectively assigned to the single active elements.
Figure 5:
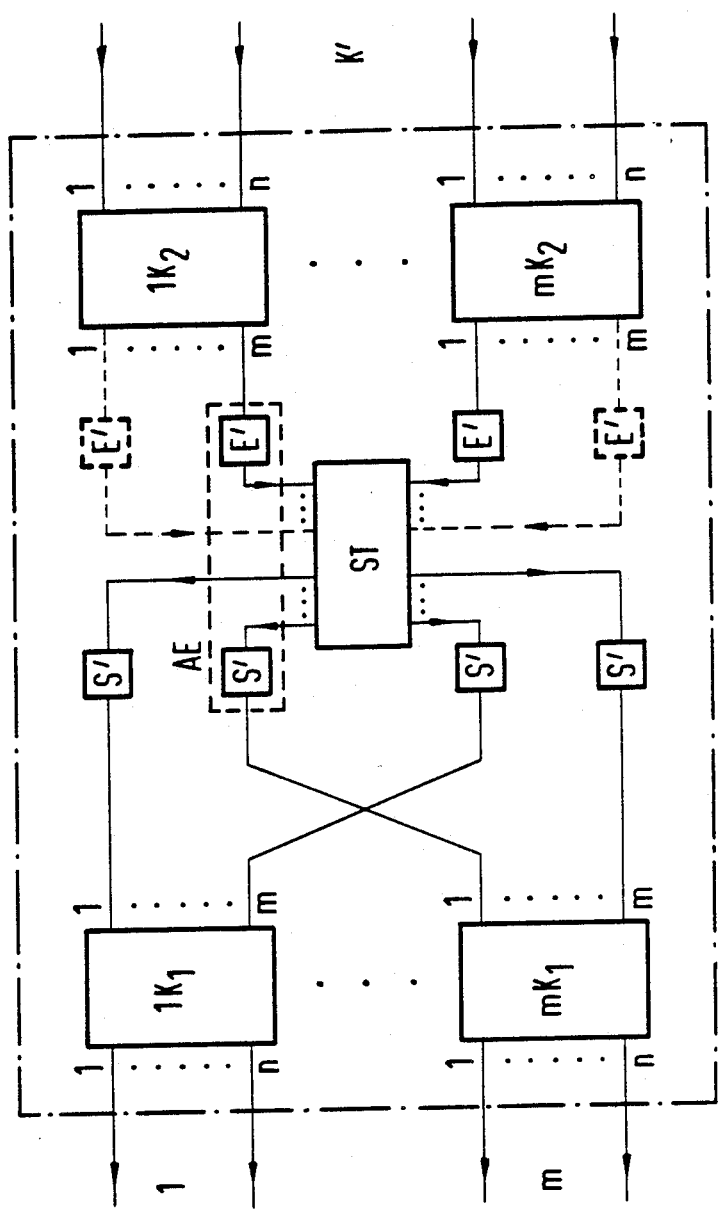
FIG. 5 is a schematic representation of still a further exemplary embodiment of a switching network, similar to the exemplary embodiment of FIG. 4, however, with a different advantageous arrangement and connection of the central control.

Another further feature of the invention provides that an individual control stage $ST_{AE}$ is assigned to each opto-electronic circuit AE, cf. FIG. 3. Advantageously, however, a common, central control ST, cf. FIGS. 4 and 5, is assigned to the active opto-electronic circuits AE instead of a respective individual control.

A respective, appertaining electro-optical signal transmitter S' is only switched on which the appertaining indicator or, respectively, the common indicator recognizes a signal arriving from the appertaining light signal output of the light signal input group as being unfalsified. This fact is of particular significance since access conflicts occur in a network of the type on which the invention is based when two or more subscribers have access to the network simultaneously. In such a case, the signals proceeding from the individual subscribers S would be mixed and, accordingly, falsified.

According to a further feature of the invention, however, it is provided that the central control ST functions to such effect that as many individual connections are maximally through-connected simultaneously as a light signal input group or, respectively, the light signal output group contains star couplers, but respectively only a single connection to one and the same star coupler of the light signal output group. It is thereby attained that falsifications of information flow are avoided.

It is also provided according to another advantageous feature of the invention that the central control ST can exercise a switching function which is known per se.

Figure 6:
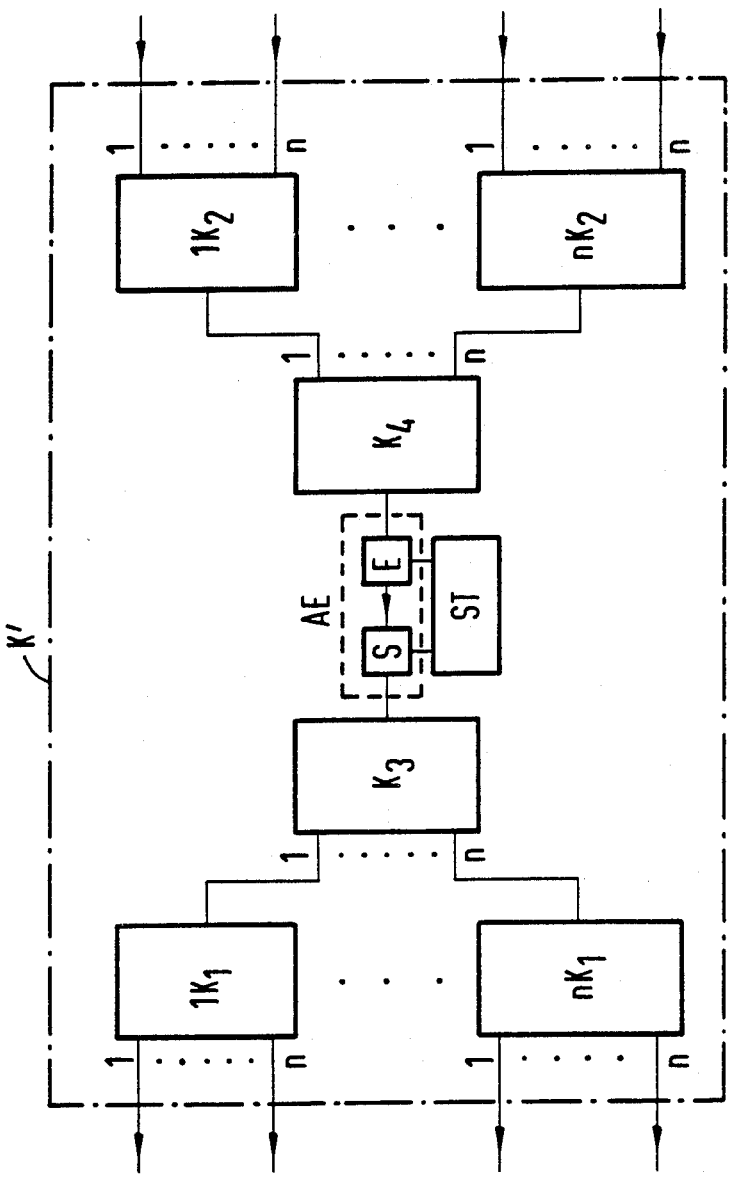
FIG. 6 is a schematic representation of a further exemplary embodiment of a switching network, similar to the exemplary embodiment of FIG. 5, in which, however, only an active element with an appertaining control is required due to the introduction of further switching network stages.

As already explained, FIG. 6 illustrates another exemplary embodiment of the switching network K', similar to the exemplary embodiment of FIG. 5, in which, however, only a single active element AE with an appertaining control ST is required due to the insertion of further switching network stages $K_3$ and $K_4$.

In summary, it should be pointed out that, given a network according to the present invention in which a switching network K' is constructed with star couplers, the ratio of the number of inputs to the number of outputs can be freely selected. Such a switching network K' retains the property of an individual star coupler, if one does not consider the increased attenuation caused by the series connection of star couplers. The switching network K' can be advantageously housed in a housing, whereby the attenuation of the intermediate lines remains negligible due to the short line arrangement which is thereby occasioned.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A network for interconnecting a plurality of optical signal transmission lines, comprising:
    a plurality of optical signal transmission lines including input lines and output lines; and
    a plurality of optical mixers including at least one input optical mixer and at least one output optical mixer,
    each of said input optical mixers comprising a plurality of inputs respectively connected to said input lines and a plurality of outputs,
    each of said output optical mixers comprising a plurality of inputs respectively connected to said outputs of said input optical mixers to provide series connections of said input and output optical mixers and a plurality of outputs respectively connected to said output lines, whereby all signal transmission paths through said network are equal to one another.

2. The network of claim 1, wherein each of said optical mixers comprises an optical star coupler.

3. The network of claim 2, wherein:
a plurality m of optical star couplers is provided as a light signal input group, each having m outputs;
a plurality m of optical star couplers is provided as a light signal output group, each having m inputs;
a plurality of opto-electrical signal receivers is provided, each said opto-electrical receiver connected to an output star coupler via a respective output line;
a plurality of electro-optical signal transmitters is provided, each of said electro-optical transmitters connected to an input star coupler via a respective input line; and
each of said m inputs of said light signal output group connected to a respective 1-of-m outputs of said light signal input group to provide a complete signal bundle in which each electro-optical signal transmitter is connected to each opto-electrical signal receiver via at least series-connected star couplers.

4. The network of claim 3, and further comprising:
a further group of optical mixers connected between said light signal input group and said light signal output group.

5. The network of claim 3, and further comprising:
a plurality of individually active opto-electronic circuits respectively interposed in the connections between said input and output signal groups.

6. The network of claim 5, wherein:
each of said opto-electronic circuits comprises an amplifier.

7. The network of claim 5, wherein:
each of said opto-electronic circuits comprises an opto-electrical signal receiver and an electro-optical transmitter connected to said receiver.

8. The network of claim 7, wherein:
each of said transmitters comprises a switchable on-off transmitter.

9. The network of claim 8, wherein:
at least one signal flow indicator is connected to said transmitter and is responsive to signal flow to switch said transmitter on and off.

10. The network of claim 8, wherein:
a respective control means is connected to each of said transmitters and receivers and responsive to signal flow in the respective receiver to switch on the respective transmitter.

11. The network of claim 8, wherein:
common central control means is connected to each of said transmitters and receivers and responsive to signal flow in a receiver to switch on the respective transmitter.

12. The network of claim 11, wherein:
said common central control means comprises means operable to simultaneously through-connect as many individual connections as there are star couplers in said light signal input group and provide only a single connection to one and the same star coupler of said light signal output group.

13. The network of claim 7, wherein:
each of said receivers comprises a signal flow indicator.

14. The network of claim 7, wherein:
a signal flow indicator is connected in common to said receivers.

* * * * *